Patented Jan. 31, 1933

1,895,811

UNITED STATES PATENT OFFICE

HARRY MORGAN, OF WALNUT PARK, CALIFORNIA

PROCESS OF TREATING ORES

No Drawing.　　Application filed February 5, 1930.　Serial No. 426,194.

My invention relates to a process of treating molybdenum ores.

The presence of copper in ores or concentrates of molybdenum is deleterious and the buyers of these ores exact a heavy penalty.

It is an object of this invention by a simple, efficient and economical process to treat such molybdenum ores to remove the copper therefrom.

My invention consists in the discovery that when copper containing modybdenum ores, and especially the sulphide ores, are treated with hot concentrated sulphuric acid, the copper will be dissolved and converted into copper sulphate which is easily removed without appreciably attacking the molybdenum.

My invention consists of the steps of the process hereinafter described and claimed.

I take molybdenite concentrates which usually contain from 40% or more of pure ore and also 10% or more of copper sulphide mostly as chalcopyrite, and mix the same with hot concentrated sulphuric acid. The commercial sulphuric acid has a strength of 90% although a strength of 50% or more would answer the purpose. The mixture is heated for approximately one hour, preferably at the boiling point of the sulphuric acid used. All of the copper, and most of the iron which may be present, and other impurities that form soluble compounds with sulphuric acid, are changed to sulphates which are soluble in water, while the molybdenite remains unchanged. Water is added to dissolve the soluble sulphates which are then removed by any preferred method from the pulp, and the insoluble pulp is then washed with water. The copper values in the solution can be recovered as copper sulphate or by cementation on iron. It will be understood that the process must be carried on in containers not attacked by the sulphuric acid used.

The operativeness of my process depends upon the use of hot concentrated sulphuric acid; diluted sulphuric acid or cold sulphuric acid will not answer the purpose, and while considerable latitude is permissible in the strength of the concentrated sulphuric acid and the degree of temperature, I prefer to use sulphuric acid having a strength of 90% and at its boiling point.

My invention is also applicable to copper containing ores of the metals of group 6, such as tungsten ores. It will, of course, be understood that the amount of sulphuric acid used depends upon the copper content. There must be a sufficiency of acid to combine with all the copper and other impurities which are attacked by sulphuric acid.

Various changes in the steps of the process may be made by those skilled in the art without departing from the spirit of my invention as claimed.

I claim:

1. A process of treating molybdenum ores containing copper comprising adding concentrated sulphuric acid to said ore, heating the mixture thereby forming copper sulphate but leaving most of the molybdenum in insoluble form, adding water to the mixture to dissolve the copper sulphate, and separating the insoluble parts of the mixture from the solution.

2. A process of treating molybdenum ores containing copper comprising adding sulphuric acid having a strength of about 90% and in a quantity sufficient to combine with all the copper present to form copper sulphate, heating the mixture for an hour at about the boiling point of the sulphuric acid used, thereby forming copper sulphate but leaving most of the molybdenum in insoluble form, diluting the mixture with water to dissolve the copper sulphate, and separating the solution from the insoluble ore.

In testimony whereof I have signed my name to this specification.

HARRY MORGAN.